United States Patent
Müller et al.

(10) Patent No.: US 9,688,814 B2
(45) Date of Patent: Jun. 27, 2017

(54) FUNCTIONALIZED POLYOXYMETHYLENE BLOCK COPOLYMERS

(71) Applicant: Covestro Deutschland AG, Leverkusen (DE)

(72) Inventors: Thomas Ernst Müller, Aachen (DE); Christoph Gürtler, Köln (DE); Walter Leitner, Aachen (DE); Henning Vogt, Aachen (DE); Gabor Barath, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 45 days.

(21) Appl. No.: 14/654,725

(22) PCT Filed: Dec. 18, 2013

(86) PCT No.: PCT/EP2013/077049
§ 371 (c)(1),
(2) Date: Jun. 22, 2015

(87) PCT Pub. No.: WO2014/095971
PCT Pub. Date: Jun. 26, 2014

(65) Prior Publication Data
US 2015/0368396 A1    Dec. 24, 2015

(30) Foreign Application Priority Data

Dec. 21, 2012 (EP) ..................................... 12199053

(51) Int. Cl.
| | |
|---|---|
| C08G 65/00 | (2006.01) |
| C08G 18/08 | (2006.01) |
| C08G 18/48 | (2006.01) |
| C08G 2/38 | (2006.01) |

(52) U.S. Cl.
CPC ............... C08G 65/00 (2013.01); C08G 2/38 (2013.01); C08G 18/08 (2013.01); C08G 18/48 (2013.01); C08G 18/4825 (2013.01); C08G 18/4829 (2013.01); C08G 18/4887 (2013.01)

(58) Field of Classification Search
CPC ........ C08G 65/00; C08G 18/08; C08G 18/48; C08G 18/4825; C08G 18/4829; C08G 2/38; C08G 18/4887
See application file for complete search history.

(56) References Cited

U.S. PATENT DOCUMENTS

| | | | |
|---|---|---|---|
| 3,218,295 A | 11/1965 | Cline | |
| 3,346,663 A * | 10/1967 | Jaacks | B62M 7/00 525/163 |
| 3,575,930 A | 4/1971 | Dinbergs | |
| 3,754,053 A | 8/1973 | Kray et al. | |
| 3,979,479 A | 9/1976 | Radici et al. | |
| 4,352,914 A | 10/1982 | Tobinaga | |
| 4,535,127 A | 8/1985 | Matsuzaki et al. | |
| 5,432,207 A | 7/1995 | Rader | |
| 7,001,959 B2 | 2/2006 | Mück et al. | |
| 2002/0016395 A1 | 2/2002 | Niino et al. | |
| 2015/0322213 A1 | 11/2015 | Muller et al. | |
| 2015/0368396 A1 | 12/2015 | Muller et al. | |

FOREIGN PATENT DOCUMENTS

| | | |
|---|---|---|
| EP | 1 418 190 A1 | 5/2004 |
| GB | 807589 A | 1/1959 |
| GB | 985616 * | 3/1965 |
| GB | 1164997 A | 9/1969 |
| JP | 04306215 A | 10/1992 |
| JP | 2007211082 A | 8/2007 |
| WO | 9606118 A1 | 2/1996 |

OTHER PUBLICATIONS

Office Action for U.S. Appl. No. 14/654,665 dated Apr. 14, 2016.
International Search Report for PCT/EP2013/077049 mailed Jul. 30, 2014.
Office Action for U.S. Appl. No. 14/654,640 dated Jan. 25, 2016.
Sharma et al., "Copolymerization reactions of carbon dioxide, Preprints of Papers", American Chemical Society. Division of Fuel Chemistry, vol. 45, No. 4 pp. 676-680 (Jan. 1, 2000).
Office Action for U.S. Appl. No. 14/654,665 dated Jan. 15, 2016.

* cited by examiner

*Primary Examiner* — Rabon Sergent
(74) *Attorney, Agent, or Firm* — K&L Gates LLP

(57) ABSTRACT

The invention relates to a method for producing functionalized polyoxymethylene block copolymers comprising the step of polymerizing formaldehyde in a reaction vessel in the presence of a catalyst, the polymerization of formaldehyde in addition taking place in the presence of a starter compound comprising at least 2 Zerewitinoff active H atoms, to obtain an intermediate product. The intermediate product obtained is subsequently reacted with a cyclic carboxylic acid ester or carbonic acid ester, thus obtaining a functionalized polyoxymethylene block copolymer. The invention further relates to functionalized polyoxymethylene block copolymers obtained by such a method and to the use of said copolymers.

13 Claims, 1 Drawing Sheet

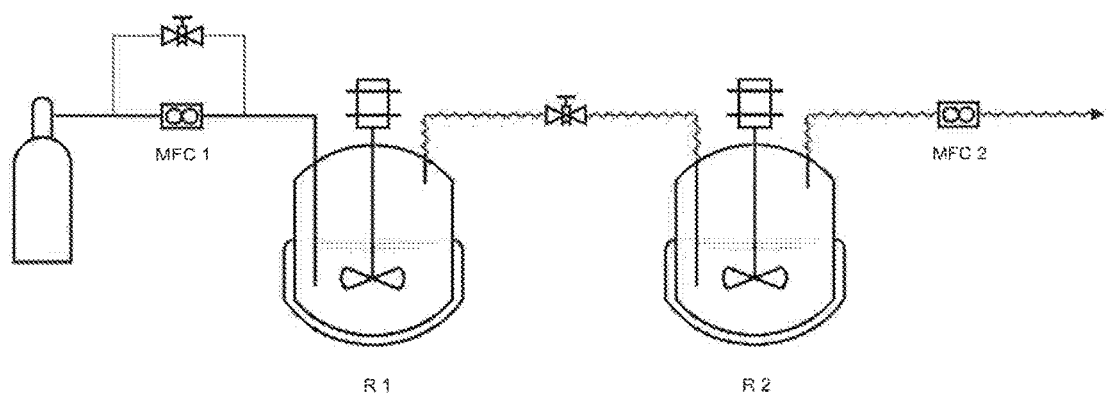

FUNCTIONALIZED POLYOXYMETHYLENE BLOCK COPOLYMERS

CROSS-REFERENCE TO RELATED APPLICATIONS

This application is a national stage application (under 35 U.S.C. §371) of PCT/EP2013/077049, filed Dec. 18, 2013, which claims benefit of European Application No. 12199053.5, filed Dec. 21, 2012, both of which are incorporated herein by reference in their entirety.

The present invention relates to a process for preparing functionalized polyoxymethylene block copolymers, comprising the step of polymerizing formaldehyde in a reaction vessel in the presence of a catalyst, wherein the polymerization of formaldehyde is additionally effected in the presence of a starter compound having at least 2 Zerewitinoff-active hydrogen atoms to obtain an intermediate, and this intermediate is reacted with cyclic carboxylic or carbonic esters to give functionalized polyoxymethylene block copolymers. It further relates to functionalized polyoxymethylene block copolymers obtainable by such a process and to the use thereof.

JP 2007 211082 A describes the reaction of polyoxyalkylene polyols having an equivalent weight of ≥2500 with formaldehyde, formaldehyde oligomers or formaldehyde polymers to give polyoxymethylene-polyoxyalkylene block copolymers. Because of the high molecular weight of the polyoxyalkylene polyols used, the resultant polyoxymethylene-polyoxyalkylene block copolymers have a molecular weight of >5000 g/mol and are therefore unsuitable as a polyurethane unit.

GB 807589 describes block copolymers containing polyoxymethylene units alongside other polymer and polycondensate units. The block copolymers described likewise have a molecular weight of ≥4500 g/mol. However, polymers having a high molecular weight are unsuitable for use as a polyurethane or polyamide unit. U.S. Pat. No. 3,979,479 discloses a two-stage process for preparing specific block copolymers comprising polyoxymethylene blocks alongside polylactone and polylactam blocks.

JP 2007 211082, GB 807589 and U.S. Pat. No. 3,979,479 describe stabilization of the terminal OH groups of the intermediates by acylation with acetic anhydride. The block copolymers prepared thus contain acetate radicals as end groups, and so no further conversion to polyurethanes, polyamides or polyester amides is possible.

U.S. Pat. No. 3,218,295 likewise discloses block copolymers containing polyoxymethylene blocks, wherein the intermediates are reacted with acetic anhydride. However, no further reaction of the products is possible since only unreactive acetate end groups are present.

EP 1 418 190 A1 describes copolymers of polyether diols and formaldehyde having a molecular weight of ≥15 000 g/mol. These polymers are not suitable for use as a polyurethane unit either because of the high molecular weight.

U.S. Pat. No. 3,754,053 describes block copolymers having a molecular weight of ≥10 000 g/mol, containing at least one polyoxymethylene segment and at least two polyoxyalkylene segments. The block copolymers described are fundamentally restricted to a maximum functionality of F≤2. For the polyurethane applications, however, as well as polymers having a functionality of F=2, also of particular interest is the route to polymers having a functionality F>2. Here too, the polymers described are unsuitable for uses as a polyurethane unit because of their high molecular weight.

US 2002/0016395 and JP 04-306215 describe block copolymers containing polyoxymethylene units and polyolefin units. Here too, the products of the invention have molecular weights of ≥10 000 g/mol and are therefore unsuitable for use as a polyurethane unit.

All the polyoxymethylene-containing block copolymers described have molecular weights of ≥4500 g/mol and, because of the attendant properties (high viscosity, low mass-based functionality), are unsuitable for use as prepolymers in the polyurethane sector. The mechanical properties of the polyurethanes prepared therefrom are likewise lowered in the case of use of high molecular weight diols and polyols.

Moreover, it is apparent from the above-cited disclosures that stabilization of polyoxymethylene block copolymers can be achieved by acylation with acetic anhydride. However, the stabilization with acetic anhydride introduces unreactive end groups unsuitable for further conversion to polyurethanes, polyamides or polyester amides. Moreover, the reaction with acetic anhydride leads to the release of acetic acid which has to be removed from the product mixture as a by-product.

Low molecular weight bifunctional or higher-functionality block copolymers containing polyoxymethylene units alongside other oligomeric structural units and carboxylic acid- or hydroxy-functionalized end groups are unknown.

U.S. Pat. No. 3,575,930 describes the reaction of dihydroxy-terminated paraformaldehyde $HO(CH_2O)_nH$ having n=2-64 with diisocyanates to give isocyanate-terminated polyoxymethylene polymers, which can be converted to polyurethanes in the reaction with diols. The paraformaldehyde used differs fundamentally from the polyoxymethylene block copolymers of the invention because of the absence of additional oligomeric units and because of its high partial crystallinity, which is manifested in physical properties such as glass transition temperature, melting point and viscosity.

The use of carboxylic acid- or hydroxy-functionalized polyoxymethylene block copolymers in the reaction with isocyanates or oxazolines, in contrast, is unknown.

The problem addressed was therefore that of providing low molecular weight polyoxymethylene block copolymers which have stable carboxylic acid- or hydroxy-functionalized end groups and as such are suitable for the reaction with di- or polyisocyanates or bis- or polyoxazolines, and wherein the average functionality F can be adjusted to a value ≥2.

This problem has been solved in accordance with the invention by a process for preparing functionalized polyoxymethylene block copolymers, comprising the step of polymerizing formaldehyde in a reaction vessel in the presence of a catalyst, in which the polymerization of formaldehyde is additionally effected in the presence of a starter compound having at least 2 Zerewitinoff-active hydrogen atoms, giving an intermediate having a number-average molecular weight of <4500 g/mol, and the resultant intermediate is reacted with a cyclic carboxylic or carbonic ester, giving a functionalized polyoxymethylene block copolymer.

The resultant functionalized low molecular weight polyoxymethylene block copolymers offer a number of advantages over existing bifunctional or higher-functionality polymers.

The reaction of the intermediate with cyclic carboxylic or carbonic esters achieves stabilization and functionalization of the polyoxymethylene block copolymers of the invention. In this reaction, ring opening to form an ester or carbonate bond introduces functional end groups in the form of hydroxyl or carboxylic acid groups. The presence of these functional end groups enables further conversion to polyurethanes, polyurethane-analogous polyamides or polyester amides, and so this opens up new fields of use for the resultant functionalized polyoxymethylene block copolymers.

In addition, the cyclic carboxylic or carbonic esters are fully incorporated into the product without releasing further cleavage products. Compared to known methods for stabilization, for example reaction with open-chain anhydrides, this gives rise to advantageous atom economy, and there is no need for additional purification steps for removal of these cleavage products, for example acetic acid, when the stabilization is conducted with acetic anhydride.

The polyoxymethylene block copolymers of the invention offer the advantage over homopolymers that particular physical properties such as glass transition temperatures, melting ranges and viscosities can be controlled via the length of the polyoxymethylene blocks in relation to the length of the starter compound.

Compared to polyoxymethylene homopolymers of the same molecular weight, partial crystallinity in the polyoxymethylene block copolymers of the invention is typically lowered, which typically likewise leads to a lowering of glass transition temperatures, melting points and viscosities. The presence of the additional oligomer blocks that originate from the starter compound additionally leads typically to an increase in the chemical and thermal stability. Pure polyoxymethylene polymers are typically restricted to a functionality $F \leq 2$. There is no method which enables control of the functionality. Via the use of starter compounds having a functionality $F \geq 2$, in contrast, access to polyoxymethylene block copolymers having a functionality $F \geq 2$ is possible.

The functionality of the polyoxymethylene block copolymers of the invention is established via deprotonatable functional groups which contain heteroatoms and are terminal or arranged along the polymer chain, for example hydroxyl groups, thiol groups, amino groups, carboxylic acid groups or carboxylic acid derivatives, for example amides. Preferably, the average functionality of the polyoxymethylene block copolymers of the invention, i.e. the average number of functional groups per molecule chain, is adjusted via the functionality of the starter used. By combination of polyoxymethylene block copolymers of the invention having different functionality $F=2, 3$, etc., it is possible to establish an average functionality $F \geq 2$.

Compared to polyether polyols of the same molecular weight, the proportion of polyoxyalkylene units which are prepared from the corresponding alkylene oxides is reduced by the polyoxymethylene fraction, which leads to an advantageous energy balance in the product. Physical properties such as glass transition temperatures, melting ranges and viscosities, for a given molecular weight, can be controlled via the length of the polyoxymethylene blocks in relation to the polyether blocks.

Polyoxymethylene block copolymers in the context of the invention refer to polymeric compounds which contain at least one polyoxymethylene block and at least one additional oligomeric block and preferably do not exceed a molecular weight in the mid-four-digit range.

A polyoxymethylene block in the context of the invention comprises at least one and preferably at most 150 oxymethylene units bonded directly to one another. An additional oligomeric block in the context of the invention differs structurally from a polyoxymethylene block and is formed from monomers other than formaldehyde, although the presence of oxymethylene groups in the additional oligomeric block is not ruled out. The incorporation of the additional oligomeric block in the context of the invention can be effected in a simple manner through the use of oligomeric starter compounds. The oligomeric starter compound is then incorporated into the polyoxymethylene block copolymer of the invention as an additional oligomeric block, or is part of the additional oligomeric block. The oligomeric starter compound, optionally immediately before the formaldehyde polymerization step of the invention, can be formed from the monomers and optionally a starter compound of relatively low molecular weight. The properties of the oligomeric block can be adjusted via the number and type of monomers present.

The intermediate in the sense of the invention is understood to mean the reaction product after the reaction of the starter compound with formaldehyde, which can easily be adjusted through the process of the invention to a number-average molecular weight of <4500 g/mol.

Functionalized polyoxymethylene block copolymers in the context of the invention refer to polyoxymethylene block copolymers in the context of the invention wherein the terminal groups are derived to an extent of at least 90 mol %, preferably 92.5 to 100 mol %, more preferably 95 to 100 mol %, based on the total amount of terminal groups, from one or more different cyclic carboxylic or carbonic esters and correspondingly contain carboxylic acid or hydroxyl groups as end groups.

Formaldehyde can be used in the gaseous state, optionally as a mixture with inert gases, e.g. nitrogen or argon, and/or with gaseous, supercritical or liquid carbon dioxide, or in the form of a formaldehyde solution. Formaldehyde solutions may be aqueous formaldehyde solutions having a formaldehyde content between 1% and 37% by weight, which may optionally contain up to 15% by weight of methanol as stabilizer. Alternatively, it is possible to use solutions of formaldehyde in polar organic solvents, for example methanol or higher mono- or polyhydric alcohols, 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another, or with water and/or other solvents. The presence of further substances in solution is likewise included as well. Preference is given to the use of gaseous formaldehyde. Particular preference is given to the use of mixtures of gaseous formaldehyde with argon and/or carbon dioxide. Likewise preferred is the use of solutions of formaldehyde in aprotic polar organic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents.

Alternatively, formaldehyde can be generated in situ from a suitable formaldehyde source. Formaldehyde sources used may be substances which contain chemically bound formaldehyde, typically in the form of oxymethylene groups, and are capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, paraformaldehyde, polyoxymethylene, dimethyl acetal, 1,3-dioxolane, 1,3-dioxane and/or 1,3-dioxepane, particular preference being given to 1,3,5-trioxane and paraformaldehyde.

The starter compounds in the context of the invention are bifunctional or higher-functionality compounds having a number-average molecular weight $M_n$ of, for example, between 100 and 3000 g/mol. The functionality is established via deprotonatable functional groups which contain heteroatoms and are terminal or arranged along the polymer chain, for example hydroxyl groups, thiol groups, amino groups, carboxylic acid groups or carboxylic acid derivatives, for example amides. Hydrogen bonded to N, O or S is referred to as a Zerewitinoff-active hydrogen (or as "active hydrogen") when it gives methane by reaction with methylmagnesium iodide by a process discovered by Zerewitinoff. Solvents used may, for example, be water, methanol or higher mono- or polyhydric alcohols, nonpolar organic solvents, for example linear or branched alkanes or alkane mixtures, toluene, the various xylene isomers or mixtures thereof, mesitylene, mono- or polyhalogenated aromatics or alkanes, open-chain or cyclic ethers, for example tetrahydrofuran (THF) or methyl tert-butyl ether (MTBE), open-chain or cyclic esters, or polar aprotic solvents, for example 1,4-dioxane, acetonitrile, N,N-dimethylformamide (DMF), N,N-dimethylacetamide, dimethyl sulfoxide (DMSO), cyclic carbonates, for example ethylene carbonate or propylene carbonate, N-methylpyrrolidone (NMP), sulfolane, tetramethylurea, N,N'-dimethylethyleneurea or mixtures thereof with one another, with water and/or with other solvents. It is also possible to use liquid or supercritical carbon dioxide as solvent in neat form or as a mixture with one of the abovementioned solvents. Preference is given to open-chain or cyclic ethers, for example tetrahydrofuran (THF) or methyl tert-butyl ether (MTBE), open-chain or cyclic esters, polar aprotic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents, and liquid or supercritical carbon dioxide. Particular preference is given to the reaction in the absence of solvents.

The reaction can be conducted in a batchwise process, in a semi-batchwise process or in a continuous process. In the preferred semi-batchwise process, a mixture of starter, catalyst and optionally a solvent is initially charged, and formaldehyde or the formaldehyde source in neat form as a gas or liquid or in solution is metered into the reaction. The amount of formaldehyde or of formaldehyde equivalents present in the formaldehyde source which is metered in is chosen so as to attain the desired molecular weight of the intermediate.

The reaction is conducted, for example at a temperature between 20 and 200° C., preferably between 20 and 120° C. and more preferably between 40 and 120° C. In the case of use of a formaldehyde source containing chemically bound formaldehyde, the reaction temperature is above the temperature required for release of formaldehyde under the given conditions. In the presence of suitable catalysts which accelerate the release of formaldehyde, the reaction temperature may be below the temperature needed for the uncatalyzed release of formaldehyde. In some cases, the catalysts for the preparation of the polyoxymethylene block copolymers of the invention may likewise function as catalysts for the release of formaldehyde.

The pressure during the polymerization of formaldehyde in the presence of the starter compound and optionally additional comonomer is 1 to 200 bar. In the case of use of gaseous formaldehyde, the pressure is preferably 5 to 100 bar, more preferably 10 to 50 bar.

The reaction time for the polymerization is, for example, 0.05 to 120 hours, preferably 0.5 to 48 hours, more preferably 1 to 24 hours. The reaction time is considered to be the period of time during which catalyst, formaldehyde and starter compound are in direct contact at reaction temperature. Especially in the case of performance in a semi-batchwise process, for example in the case of introduction of gaseous formaldehyde into the reaction mixture, the reaction time is guided by the amount of formaldehyde metered in or of formaldehyde equivalents metered in.

The polymerization of formaldehyde in the presence of a catalyst and a starter compound in the context of the invention gives an intermediate containing at least one polyoxymethylene block and at least one additional oligomeric block (polyoxymethylene block copolymer in the context of the invention). The resultant intermediate (polyoxymethylene block copolymer) has a number-average molecular weight $M_n$ of <4500 g/mol.

Cyclic carboxylic or carbonic esters in the context of the invention are cyclic compounds containing at least one ester or carbonate group as part of the ring system, for example aliphatic or aromatic lactones, lactides, cyclic carbonates, and aliphatic or aromatic cyclic anhydrides.

After the metered addition of the desired amount of formaldehyde or formaldehyde equivalents and optionally of additional comonomer, the resultant oxymethylene block copolymer intermediate is reacted with a cyclic carboxylic or carbonic ester or a mixture of various cyclic carboxylic or carbonic esters.

The amount of the cyclic carboxylic or carbonic esters is guided by the molar amount of the functional groups present in the additional oligomer. Thus, the minimum amount required is $$n_{ester,\ min} = (m_{starter}/M.W._{starter}) \times F_{starter} \quad \text{(equation 1)},$$

where $m_{starter}$ is the mass of the starter compound used, $M.W._{starter}$ is the number-average molecular weight thereof and $F_{starter}$ is the average functionality thereof, i.e. the average number of functional groups per starter molecule.

In the case of use of cyclic anhydrides, the molar amount is one to three times, preferably one to two times and more preferably one to 1.5 times $n_{ester,\ min}$. The reaction with the chain end of the polyoxymethylene block copolymer intermediate opens the ring and forms an ester bond, with simultaneous formation of a terminal carboxylic acid. For each chain end, a maximum of one cyclic anhydride is thus incorporated.

In the case of use of lactones, lactides and cyclic carbonates, the preferred molar amount is one to 50 times, preferably 2 to 20 times and more preferably 5 to 10 times $n_{ester,\ min}$. The reaction with the chain end of the polyoxymethylene block copolymer intermediate opens the ring and forms an ester bond in the case of the lactones or lactides, and a carbonate bond in the case of the cyclic carbonates. In both cases, a terminal hydroxyl group is present after the incorporation. The latter can be reacted with a further lactone, lactide, cyclic carbonate or, in the case of presence thereof, with a cyclic anhydride, such that the chain ends present may also be homo- or copolymer blocks of lactones, lactides and/or cyclic carbonates, optionally terminated by an acid group originating from a cyclic anhydride.

The cyclic carbonic or carboxylic esters can be metered in in neat form or dissolved in a solvent suitable for the polymerization of formaldehyde in the presence of the starter compound and optionally additional comonomer.

Preference is given to the metered addition of the cyclic carboxylic or carbonic ester in neat form or dissolved in a solvent identical to the solvent used in the polymerization of formaldehyde in the presence of the additional oligomer and optionally additional comonomer.

The cyclic carboxylic or carbonic ester can be metered in at temperatures between 20 and 200° C., preferably between 20 and 120° C. The total amount of cyclic carboxylic or carbonic esters can be metered in in a pulsed manner in one or more pulses or continuously over a prolonged period.

The cyclic carbonic or carboxylic esters are metered in under atmospheric pressure or elevated pressure, for example the pressure used during the polymerization of formaldehyde in the presence of the starter compound and optionally additional comonomer.

After the metering operation has ended, before or after any pressure present is released, the reaction mixture is stirred at temperatures between 20 and 200° C., preferably 20 to 150° C., more preferably 80 to 120° C., over a further period of 0.1 to 24 hours, preferably 1 to 16 hours.

After the reaction of the polyoxymethylene block copolymers with the cyclic carboxylic or carbonic esters, before or after any pressure present has been released, it is possible to deactivate the excess unreacted cyclic carboxylic or carbonic esters present in the reaction mixture, and optionally the catalyst, for example by means of water, aqueous bases, for example alkali metal or alkaline earth metal hydroxide, alkali metal carbonate or alkali metal hydrogencarbonate, alkali metal alkoxide, alkali metal carboxylate or aqueous ammonia solution, aqueous buffer solutions containing mixtures of carbonate and/or phosphate salts in combination with one or more hydrogencarbonate, phosphate, hydrogenphosphate and/or dihydrogenphosphate salts, or alcohols, amines or mixtures of two or more of the aforementioned components.

In the case of presence of carboxylic acid-terminated polyoxymethylene block copolymers, the isolation may be preceded by a further reaction with equimolar amounts or an excess of epoxides, based on the number of carboxylic acid groups present, so as to obtain hydroxy-terminated, low molecular weight polyoxymethylene block copolymers. The reaction with the epoxides preferably precedes any deactivation of any excess, unreacted cyclic carboxylic or carbonic esters present in the reaction mixture which is to be conducted.

For isolation of the functionalized, low molecular weight polyoxymethylene block copolymers of the invention, after any pressure present has been released, the volatile components, for example solvents, unreacted monomers and/or cyclic carboxylic or carbonic esters, or the hydrolysis or aminolysis products thereof, can be removed, for example by vacuum distillation or thin-film evaporation. Additional purification steps, for example extraction, precipitation and/or filtration, for example for removal of the catalyst, unreacted monomers and/or cyclic carboxylic or carbonic esters or the hydrolysis or aminolysis products thereof and/or any salts present in the reaction mixture, are likewise included.

The functionalized, low molecular weight polyoxymethylene block copolymers obtainable by the process of the invention have a low level of by-products and can be processed without any problem.

Embodiments of the process of the invention are described hereinafter. They can be combined with one another as desired, unless the opposite is clear from the context.

The resultant intermediate (polyoxymethylene block copolymer) has a number-average molecular weight of <4500 g/mol, preferably ≤3500 g/mol, and more preferably ≤3000 g/mol. The molecular weight can be determined by means of gel permeation chromatography against polypropylene glycol standards or via the OH number. Preferably, the molecular weight of the intermediate is ≥92 g/mol to <4500 g/mol, especially preferably ≥500 g/mol to <4500 g/mol, more preferably ≥600 g/mol to ≤3500 g/mol and very especially preferably ≥600 g/mol to ≤3000 g/mol.

The mean molecular weight of the intermediate (polyoxymethylene block copolymer) is adjusted to a value of <4500 g/mol via the stoichiometry of the feedstocks. Thus, the sum total of the molar amounts $n_i$ of all the monomers i introduced into the polyoxymethylene block copolymer of the invention, i.e. the sum total of the molar amount $n_{FA}$ of formaldehyde or of the formaldehyde equivalents present in the formaldehyde source and the molar amounts of the additional comonomers, and also the sum total of the molar amounts $n_j$ of all the end groups j (cyclic carbonic or carboxylic esters) introduced into the polyoxymethylene block copolymer of the invention, is chosen such that $$M_{Starter} + \frac{\sum_i n_i \times M_i + \sum_j n_j \times M_j}{n_{Starter}} < 4500 \text{ g/mol} \quad \text{(equation 2)}$$

where $n_{Starter}$ is the molar amount and $M_{Starter}$ the number-average molecular weight of the starter compound, and $M_i$ is the molecular weight of the respective monomer i and $M_j$ the molecular weight of the respective end group j.

In a further embodiment of the method according to the invention, the catalyst is selected from the group of the basic catalysts and/or the Lewis-acidic catalysts. Catalysts used are compounds which catalyze the polymerization of formaldehyde. These may be basic catalysts or Lewis-acidic catalysts containing, as the Lewis-acidic center, for example, a metal of the third, fourth or fifth main group, especially boron, aluminum, tin or bismuth, a metal of the third or fourth transition group or of the lanthanoid series, vanadium, molybdenum, tungsten or a metal of the eighth to tenth transition groups. Preference is given to Lewis-acidic catalysts.

Examples of basic catalysts are tertiary or aromatic basic amines, for example triethylamine and other trialkylamines, pyridine and mono- or polysubstituted pyridine derivatives, N-alkyl- or N-arylimidazole, 1,4-diazabicyclo[2.2.2]octane (DABCO), 4-(dimethylamino)pyridine (DMAP), 1,8-diazabicyclo[5.4.0]undec-7-ene (DBU), triazabicyclo[4.4.0]dec-5-ene (TBD) and 7-methyl-1,5,7-triazabicyclo[4.4.0]dec-5-ene (MTBD). Further examples of basic catalysts are inorganic basic compounds, for example alkali metal hydroxides, especially potassium hydroxide and cesium hydroxide. The addition of further additives for increasing solubility and/or reactivity, for example crown ethers or tetraalkylammonium, tetraalkylphosphonium or tetraarylphosphonium salts, is not ruled out.

Lewis-acidic catalysts contain, as the Lewis-acidic center, one or more coordinatively unsaturated metal atoms, for example metals of the third, fourth or fifth main group, especially boron, aluminum, tin or bismuth, metals of the third and fourth transition group and metals of the lanthanoid series, vanadium, molybdenum, tungsten, metals of the eighth to tenth transition groups, especially iron, cobalt, nickel, rhodium, iridium, palladium, platinum, copper or zinc. It is a feature of the coordinatively unsaturated Lewis-acidic center that nucleophilic molecules can bind thereto.

The coordinatively unsaturated Lewis-acidic center may already be present in the compound used as catalyst or forms in the reaction mixture, for example as a result of elimination of a weakly bound nucleophilic molecule. Particular preference is given to Lewis-acidic catalysts containing, as the Lewis-acidic center, one or more tin, bismuth, vanadium or molybdenum atoms, for example dibutyltin dilaurate (DBTL), dibutyltin oxide, bismuth tri(2-ethylhexanoate), lithium orthovanadate or lithium molybdate.

The catalyst is typically used in a molar ratio of 1:10 000 to 10:1, preferably 1:1000 to 1:1, more preferably 1:1000 to 1:10, relative to the functional groups present in the starter compound.

In a further embodiment of the process of the invention, the reaction of the intermediate with the cyclic carboxylic or carbonic ester is conducted in the presence of a catalyst which is the same catalyst as in the preceding polymerization of formaldehyde.

In a further embodiment of the process of the invention, the starter molecule has a number-average molecular weight $M_n$ of ≥62 g/mol to ≤4470 g/mol, preferably of ≥90 g/mol to ≤3470 g/mol and more preferably of ≥100 g/mol to ≤3000 g/mol.

The starter compounds typically have a functionality of ≥2, for example within a range from ≥2 to ≤6, preferably from ≥2.0 to ≤4 and more preferably from ≥2.0 to ≤3.

In a further embodiment of the process of the invention, the starter molecule is selected from the group of the polyether polyols, polyester polyols, polyether ester polyols, polycarbonate polyols and/or polyacrylate polyols. The polyols may have, for example, a number-average molecular weight $M_n$ of ≥62 g/mol to ≤8000 g/mol, preferably of ≥90 g/mol to ≤5000 g/mol and more preferably of ≥92 g/mol to ≤2000 g/mol.

The average OH functionality of the polyols is ≥2, for example within a range from ≥2 to ≤6, preferably from ≥2.0 to ≤4 and more preferably from ≥2.0 to ≤3.

Usable polyether polyols are, for example, polytetramethylene glycol polyethers, as obtainable by polymerization of tetrahydrofuran by means of cationic ring opening.

Likewise suitable polyether polyols are addition products of styrene oxide, ethylene oxide, propylene oxide, butylene oxides and/or epichlorohydrin onto di- or polyfunctional starter molecules.

Suitable starter molecules for the polyether polyols are, for example, water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, butane-1,4-diol, hexane-1,6-diol and low molecular weight hydroxyl-containing esters of such polyols with dicarboxylic acids.

Suitable polyester polyols include polycondensates of di- and additionally tri- and tetraols and di- and additionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols for preparation of the polyesters.

Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate.

Polycarboxylic acids used may, for example, be phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. The acid sources used may also be the corresponding anhydrides.

If the mean functionality of the polyol to be esterified is >2, it is additionally also possible to use monocarboxylic acids such as benzoic acid and hexanecarboxylic acid as well.

Hydroxycarboxylic acids which can additionally be used as reaction participants in the preparation of a polyester polyol having terminal hydroxyl groups are, for example, hydroxycaproic acid, hydroxybutyric acid, hydroxydecanoic acid, hydroxystearic acid and the like. Suitable lactones include caprolactone, butyrolactone and homologs.

Usable polycarbonate polyols are polycarbonates having hydroxyl groups, for example polycarbonate diols. These are obtainable by reaction of carbonic acid derivatives, such as diphenyl carbonate, dimethyl carbonate or phosgene, with polyols, preferably diols.

Examples of such diols are ethylene glycol, propane-1,2- and 1,3-diol, butane-1,3- and 1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, and lactone-modified diols of the aforementioned type.

Usable polyether ester polyols are those compounds which contain ether groups, ester groups and OH groups. Organic dicarboxylic acids having up to 12 carbon atoms are suitable for preparation of the polyether ester polyols, preferably aliphatic dicarboxylic acids having ≥4 to ≤6 carbon atoms or aromatic dicarboxylic acids, which are used individually or in a mixture. Examples include suberic acid, azelaic acid, decanedicarboxylic acid, maleic acid, malonic acid, phthalic acid, pimelic acid and sebacic acid, and especially glutaric acid, fumaric acid, succinic acid, adipic acid, phthalic acid, terephthalic acid and isophthalic acid. Derivatives of these acids used may, for example, be the anhydrides thereof and the esters and monoesters thereof with low molecular weight monofunctional alcohols having ≥1 to ≤4 carbon atoms.

A further component used for preparation of the polyether ester polyols is polyether polyols, which are obtained by alkoxylating starter molecules such as polyhydric alcohols. The starter molecules are at least difunctional, but may optionally also contain proportions of higher-functionality, especially trifunctional, starter molecules.

Starter molecules for these polyether polyols are, for example, diols having number-average molecular weights $M_n$ of preferably ≥18 g/mol to ≤400 g/mol or of ≥62 g/mol to ≤200 g/mol, such as ethane-1,2-diol, propane-1,3-diol, propane-1,2-diol, butane-1,4-diol, pentene-1,5-diol, pentane-1,5-diol, neopentyl glycol, hexane-1,6-diol, heptane-1,7-diol, octane-1,8-diol, decane-1,10-diol, 2-methylpropane-1,3-diol, 2,2-dimethylpropane-1,3-diol, 3-methylpentane-1,5-diol, 2-butyl-2-ethylpropane-1,3-diol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, such as diethylene glycol.

As well as the diols, it is also possible to use polyols having number-average functionalities of >2 to ≤8 or of ≥3 to ≤4 as well, for example 1,1,1-trimethylolpropane, triethanolamine, glycerol, sorbitan and pentaerythritol, and also polyethylene oxide polyols started from triols or tetraols and having mean molecular weights of preferably ≥62 g/mol to ≤400 g/mol or of ≥92 g/mol to ≤200 g/mol.

Polyether ester polyols can also be prepared by the alkoxylation of reaction products which are obtained by the reaction of organic dicarboxylic acids and diols. Derivatives of these acids used may, for example, be the anhydrides thereof, for example phthalic anhydride.

Polyacrylate polyols can be obtained by free-radical polymerization of olefinically unsaturated monomers having hydroxyl groups or by free-radical copolymerization of olefinically unsaturated monomers having hydroxyl groups with optionally other olefinically unsaturated monomers. Examples thereof are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable olefinically unsaturated monomers having hydroxyl groups are especially 2-hydroxyethyl acrylate, 2-hydroxyethyl methacrylate, the hydroxylpropyl acrylate isomer mixture obtainable by addition of propylene oxide onto acrylic acid, and the hydroxypropyl methacrylate isomer mixture obtainable by addition of propylene oxide onto methacrylic acid. Terminal hydroxyl groups may also be in protected form. Suitable free-radical initiators are those from the group of the azo compounds, for example azoisobutyronitrile (AIBN), or from the group of the peroxides, for example di-tert-butyl peroxide.

In a further embodiment of the process of the invention, the cyclic carboxylic or carbonic ester is selected from the group of the aliphatic or aromatic lactones, lactides, cyclic carbonates and/or cyclic anhydrides.

Aliphatic or aromatic lactones in the context of the invention are cyclic compounds containing an ester bond in the ring, preferably compounds of the formulae (I), (II) or (III),

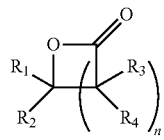

(I)

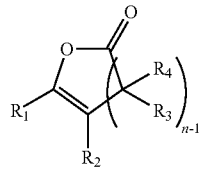

(II)

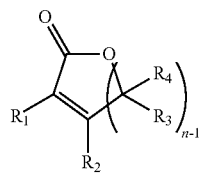

(III)

where
R1, R2, R3 and R4 are each independently hydrogen, a linear or branched C1 to C22 alkyl radical optionally containing heteroatoms, a linear or branched, mono- or polyunsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered ring or polycyclic ring system optionally containing heteroatoms, where the compounds of the formula I may also be substituted by chlorine, bromine, nitro groups or alkoxy groups, n is an integer greater than or equal to 1, preferably 1, 2, 3 or 4, and R3 and R4 in repeat units (n>1) may each be different.

Preferred compounds of the formulae (I), (II) or (III) are 4-membered ring lactones such as β-propiolactone, β-butyrolactone, β-isovalerolactone, β-caprolactone, β-isocaprolactone, β-methyl-β-valerolactone, 5-membered ring lactones such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered ring lactones such as δ-valerolactone, 1,4-dioxan-2-one, dihydrocoumarin, 1H-isochromen-1-one, 8H-pyrano[3,4-b]pyridine-8-one, 1,4-dihydro-3H-isochromen-3-one, 7,8-dihydro-5H-pyrano[4,3-b]pyridine-5-one, 4-methyl-3,4-dihydro-1H-pyrano[3,4-b]pyridine-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered ring lactones, such as ε-caprolactone, p-dioxanone and 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, ring lactones having higher numbers of members, such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably compounds of the formula (IV)

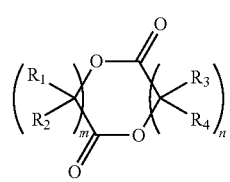

(IV)

where R1, R2, R3 and R4 are each as defined above,
and m and n are each independently an integer greater than or equal to 1, preferably 1, 2, 3 or 4,
and R1 and R2 in repeat units (m>1) and R3 and R4 in repeat units (n>1) may each be different.

Preferred compounds of the formula (IV) are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-methyl-6-(prop-2-en-1-yl)-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms).

Particular preference is given to L-lactide.

Cyclic carbonates used are preferably compounds of the formula (V)

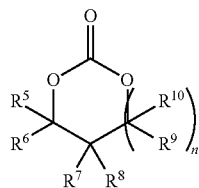

(V)

where

R5, R6, R7, R8, R9 and R10 are each independently hydrogen, a linear or branched C1 to C22 alkyl radical optionally containing heteroatoms, a linear or branched, mono- or polyunsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered ring or polycyclic ring system optionally containing heteroatoms, n is an integer greater than or equal to 0, preferably 0, 1, 2 or 3, and R9 and R10 in repeat units (n>1) may each be different, where the compounds of the formula (V) may also be substituted by chlorine, bromine, nitro groups or alkoxy groups.

Preferred compounds of the formula (V) are ethylene carbonate, propylene carbonate, butane-2,3-diol carbonate, pentane-2,3-diol carbonate, 2-methylpropane-1,2-diol carbonate, 2,3-dimethylbutane-2,3-diol carbonate, trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythrityl diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one, 5,5-dipropyl-1,3-dioxan-2-one.

Particular preference is given to ethylene carbonate, propylene carbonate, trimethylene carbonate and neopentyl glycol carbonate.

Cyclic anhydrides used are preferably compounds of the formula (VI), (VII) or (VIII)

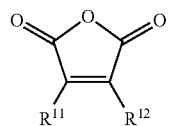

(VI)

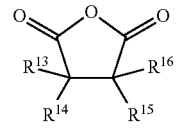

(VII)

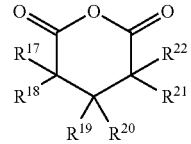

(VIII)

where

R11 and R12 are hydrogen, halogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or R11 and R12 may be members or a saturated or unsaturated 4- to 7-membered ring or polycyclic system optionally containing heteroatoms, and R11 and R12 together preferably give a benzene ring optionally provided with additional substituents, R13, R14, R15 and R16 are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members or a saturated or unsaturated 4- to 7-membered ring or polycyclic system optionally containing heteroatoms and R17, R18, R19, R20, R21 and R22 are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members or a saturated or unsaturated 4- to 7-membered ring or polycyclic system optionally containing heteroatoms, where the compounds of the formula (VI) and (VII) and (VIII) may also be substituted by chlorine, bromine, nitro groups or alkoxy groups.

Preferred compounds of the formula (VI), (VII) or (VIII) are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, and allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide, 3[(2E)-but-2-en-1-yl]dihydrofuran-2,5-dione. Particular preference is given to succinic anhydride, maleic anhydride, glutaric anhydride and phthalic anhydride.

In a specific embodiment, the cyclic carboxylic or carbonic esters are at least partly identical to the comonomers mentioned below.

In a further embodiment of the process of the invention, the formaldehyde is introduced into the reaction vessel in the form of gaseous formaldehyde.

In the process of the invention, the polyoxymethylene units are joined to the starter compound either directly or indirectly via one or more further comonomers or spacers. It is also possible for a plurality of polyoxymethylene units to be joined to one another via one or more further comonomers. Therefore, in a further embodiment of the process of the invention, the polymerization is additionally effected in the presence of a further comonomer. Further comonomers used may, for example, be cyclic ethers, especially epoxides, for example ethylene oxide, propylene oxide or styrene oxide, oxetane, THF, dioxane, cyclic acetals, for example 1,3-dioxolane or 1,3-dioxepane, cyclic esters, for example γ-butyrolactone, γ-valerolactone, ε-caprolactone, or cyclic acid anhydrides, for example maleic anhydride, glutaric anhydride or phthalic anhydride. Preferred further comonomers are epoxides, cyclic acetals and cyclic esters; particularly preferred further comonomers are ethylene oxide, propylene oxide, 1,3-dioxolane, 1,3-dioxepane and ε-caprolactone.

The metered addition of further comonomers can be effected in neat form or in solution. In an alternative embodiment, the metered addition of further comonomers is effected in a mixture with formaldehyde or the formaldehyde source. The metered addition of further comonomers can be effected prior to the metered addition, parallel to the metered addition or after the metered addition of formaldehyde or the formaldehyde source.

The present invention further provides functionalized polyoxymethylene block copolymers obtainable by a process of the invention.

In one embodiment, the functionalized polyoxymethylene block copolymers have a number-average molecular weight of ≤12 000 g/mol, preferably ≤7500 g/mol, more preferably ≤5000 g/mol. The number-average molecular weight can be determined, for example, by GPC against polystyrene standards or, depending on the nature of the end group, via the OH number or acid number.

In a further embodiment, the functionalized polyoxymethylene block copolymers have a viscosity at 20° C. of ≤100 000 mPa·s, preferably of ≤50 000 mPa·s, more preferably of ≤15 000 mPa·s.

The carboxylic acid-functionalized, low molecular weight polyoxymethylene block copolymers of the invention can be reacted with diisocyanates with elimination of $CO_2$ to form polyurethane-analogous polyamides using a suitable catalyst, for example magnesium tetrafluoroborate or magnesium perchlorate. In addition, the carboxylic acid-functionalized polyoxymethylene block copolymers of the invention can be reacted with bis- or polyoxazolines to form high molecular weight esteramides. By reaction with equimolar amounts or an excess (based on the acid functionality) of epoxides, it is possible to obtain hydroxy-terminated polyoxymethylene block copolymers.

The hydroxy-functionalized, low molecular weight polyoxymethylene block copolymers of the invention can be reacted directly in the reaction with di- or polyisocyanates to give polyurethanes or isocyanate-functionalized polyurethane prepolymers.

For polyurethane, polyamide and polyesteramide applications, preference is given to using polyoxymethylene block copolymers having a functionality of at least 2. For the preparation of thermoplastic polyurethanes, preference is given to using polyoxymethylene block copolymers having a functionality of exactly 2.

In addition, the polyoxymethylene block copolymers obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyoxymethylene block copolymers to be used have to fulfill certain material properties, for example molecular weight, viscosity, functionality and/or hydroxyl number or acid number.

Therefore, the invention further provides for the use of polyoxymethylene block copolymers functionalized in accordance with the invention for production of polyamides, polyurethanes, washing and cleaning composition formulations, drilling fluids, fuel additives, ionic and nonionic surfactants, lubricants, process chemicals for papermaking or textile production, or cosmetic formulations.

EXAMPLES

The invention is illustrated in more detail by the figures and examples which follow, but without being restricted thereto.

BRIEF DESCRIPTION OF THE DRAWING

FIG. 1 a reactor arrangement for performance of the process of the invention

H-Functional Oligomeric Compounds Used:

PET-1: bifunctional poly(oxyethylene)polyol having the nominal molecular weight M.W.=600 g/mol and the average empirical formula $HO(CH_2CH_2O))_{13.23}H$. An OH number of 187.15 mg$_{KOH}$/g, a number-average molecular weight $M_n$=658 g/mol and a polydispersity index PDI=1.087 (measured by GPC in chloroform against polypropylene glycol standards) were measured.

Isocyanates Used:

Isocyanate 1 having an average functionality of 2.6 and an NCO value of 31.1-31.1%, containing 42.4% 4,4'-MDI, 12.6% 2,4'-MDI, 2.2% 2.2'-MDI (Desmodur VP PU 0325 from Bayer).

The formaldehyde source used was trioxane (CAS [110-88-3]) from Aldrich (catalog number T81108).

Description of the Methods:

The molar mass distributions were determined by means of gel permeation chromatography (GPC).

Gel permeation chromatography (GPC): The measurements were effected on the Agilent 1200 Series instrument (G1310A Iso Pump, G1329A ALS, G1316A TCC, G1362A RID, G1365D MWD), detection via RID; eluent: chloroform (GPC grade), flow rate 1.0 ml/min; column combination: PSS SDV precolumn 8×50 mm (5 μm), 2×PSS SDV linear S 8×300 mL (5 μm). Polypropylene glycol samples of known molar mass from PSS Polymer Standards Service were used for calibration. The measurement recording and evaluation software used was the software package "PSS WinGPC Unity". The GPC chromatograms were recorded in accordance with DIN 55672-1, except using chloroform as eluent rather than THF.

¹H NMR spectroscopy: The measurements were effected on the Bruker AV400 instrument (400 MHz); the chemical shifts were calibrated relative to the solvent signal (CDCl$_3$, δ=7.26 ppm); s=singlet, m=multiplet, bs=broadened singlet, kb=complex region. The integrals were reported relative to one another.

¹³C NMR spectroscopy: The measurements were effected on the Bruker AV400 instrument (100 MHz); the chemical shifts were calibrated relative to the solvent signal (CDCl$_3$, δ=77.16 ppm); APT (attached proton test): CH$_2$, C$_{quart}$: positive signal (+); CH, CH$_3$: negative signal (−); HMBC: Hetero multiple bond correlation; HSQC: Heteronuclear single-quantum correlation.

Infrared (IR) spectroscopy: The measurements were effected on the Bruker Alpha-P FT-IR spectrometer; the measurements were effected neat; signal intensities: vs=very strong, s=strong, m=medium, w=weak, vw=very weak; b=broadened band.

Electrospray mass spectrometry (ESI-MS): The measurements were effected on the Thermo Fisher Scientific LTQ Orbitrap XL instrument; samples were diluted with MeOH.

The OH number (hydroxyl number) was determined on the basis of DIN 53240-2, except using N-methylpyrrolidone rather than THF/dichloromethane as the solvent. A 0.5 molar ethanolic KOH solution was used for titration (endpoint recognition by means of potentiometry). The test substance used was castor oil with certified OH number. The reporting of the unit in "mg$_{KOH}$/g" relates to mg[KOH]/g [product]. The OH number is related to the equivalent molar mass according to the following equation:

OH number [mg$_{KOH}$/g]=56 100 [mg$_{KOH}$/mol]/ equivalent molar mass [g/mol]

The equivalent molar mass is understood to mean the number-average total molar mass of the material containing active hydrogen atoms divided by the number of active hydrogen atoms (functionality).

The acid number was determined in accordance with (DIN EN ISO 2114), except that titration was effected with a 0.5 molar methanolic potassium hydroxide solution rather than an ethanolic potassium hydroxide solution. The endpoint was recognized by means of potentiometry. The reporting of the unit in "mg$_{KOH}$/g" relates to mg[KOH]/g [polyacid].

The viscosity was determined on an Anton Paar Physica MCR 501 rheometer. A cone-plate configuration having a separation of 50 μm was selected (DCP25 measurement system). 0.1 g of the substance was applied to the rheometer plate and subjected to a shear of 0.01 to 1000 l/s at 25° C., and the viscosity was measured every 10 s for 10 min. The values reported are the viscosity averaged over all the measurement points or, in the case of non-constant viscosity behavior, the maximum and minimum values measured.

The glass transition temperatures (T$_g$) were determined by DSC (differential scanning calorimetry) on the Mettler Toledo DSC 1 STAR$^e$ instrument. The sample was analyzed at a heating rate of 10 K/min over two heating cycles from −80° C. to +250° C. The glass transition temperature was determined in the second heating rate.

For the reactions, an experimental apparatus consisting of two 200 mL stainless steel autoclaves which were connected via a heatable ⅛ inch glass capillary ("bridge") which could be shut off with a valve was used. Both reactors were equipped with a hollow shaft stirrer and manometer and were heatable independently of one another. The gas supply to reactor 1 ("depolymerization reactor" R1) was via an immersed tube connected to a mass flow regulator (MFC 1, capacity: 100 mL/min). The gas stream was passed through the bridge from reactor 1 into reactor 2. In reactor 2 ("polymerization reactor" R2) there was a gas outlet, and the offgas flow was controlled with the aid of a second mass flow regulator (MFC 2, capacity: 100 mL/min). Via MFC 1, a carrier gas stream (argon or carbon dioxide) was passed through reactor 1 with the volume flow rate $\dot{V}_{in}$, and the depolymerization of paraformaldehyde to gaseous formaldehyde was conducted therein. The carrier gas stream enriched with formaldehyde gas was then passed through the heated bridge into reactor 2, in which the polymerization was conducted. Constant pressure in the overall system was assured by regulation of MFC 2 as a slave with the pressure transducer mounted on reactor 2.

The pressure reactors used in the examples had a height (internal) of 6.84 cm and an internal diameter of 5.98 cm. The reactors were equipped with an electrical heating jacket (maximum heating power 240 watts). In addition, the reactors were equipped with an inlet tube, and each was equipped with a thermal sensor of diameter 1.6 mm which projected into the reactor up to 3 mm above the base.

The hollow shaft stirrer used in the examples was a hollow shaft stirrer in which the gas was introduced into the reaction mixture via a hollow shaft in the stirrer. The stirrer body mounted on the hollow shaft had four arms and had a diameter of 25 mm and a height of 7 mm. At each end of the arm was mounted a gas outlet which had a diameter of 3 mm. The rotation of the stirrer gave rise to a reduced pressure such that the gas present above the reaction mixture (CO$_2$ and possibly formaldehyde) was sucked in and introduced through the hollow shaft of the stirrer into the reaction mixture.

Example 1

Preparation of a Carboxylic Acid-Terminated Polyethylene Oxide-Polyoxymethylene Block Copolymer Reactor 1 was initially charged with a suspension of 30.18 g (0.335 mol) of 1,3,5-trioxane and 0.62 g (1.92 mmol) of 4-dodecylbenzenesulfonic acid in 30 ml of undecane. Reactor 2 contained a solution of 430 mg (0.68 mmol) of dibutyltin dilaurate (DBTL) and 1.09 g (3.34 mmol) of cesium carbonate in 20.11 g (33.5 mmol) of PET-1. Via a bypass line connected to MFC 1, the whole system with the bridge open was pressurized to 20 bar with CO$_2$. Then the bridge was closed and the pressure in reactor 1 was reduced to 5 bar by means of a gas outlet valve. The reaction mixture in reactor 1 was heated to 65° C. with the bridge shut off and kept at this temperature for 1.5 hours. Subsequently, the temperature in reactor 1 was increased to 110° C. The reaction mixture in reactor 2 was heated at 60° C. while stirring. The bridge temperature was adjusted to 170° C. On attainment of the reaction temperature, the pressure in reactor 2 was adjusted to a value between 17 and 19 bar. The pressure in reactor 1 was adjusted to 20 bar with CO$_2$ via the bypass. The bypass line was closed and a constant CO$_2$ flow rate $\dot{V}_{in}$=160 ml/min was established using the mass flow regulators. Directly thereafter, the bridge was opened and the total pressure in the system was adjusted to 20 bar with the aid of MFC 2. After 3.2 h, the bridge was closed, the system was cooled to room temperature and the pressure was released separately in reactor 1 and reactor 2. Subsequently, while stirring at an internal temperature of 40° C., an HPLC pump was used to introduce a solution of 7.53 g (65.9 mmol) of glutaric anhydride in 20 mL of CH$_2$Cl$_2$ into reactor 2 at a flow rate of 5 mL/min. After the addition had ended, the reaction mixture in reactor 2 was stirred at 100° C. for a further 16 h. Weighing of reactor 2 before the removal of the product showed an increase in weight of 3.39 g (difference in mass minus the mass of the glutaric anhydride fed in) for the reaction, which corresponds to a transfer of 3.39 g (113 mmol) of gaseous formaldehyde. 30.92 g of a viscous, colorless oil were removed from reactor 2. As a result of the transfer of 3.39 g (113 mmol) of formaldehyde, the PET-1 used as oligomer was extended by an average of 3.4 formaldehyde units per molecule, or 1.7 formaldehyde units per chain end.

Viscosity: 1600 mPa·s

Acid number: 126.7 $mg_{KOH}/g$

By gel permeation chromatography (GPC) against polypropylene glycol standards, a bimodal molecular weight distribution was observed. The number-average molecular weight of the overall sample was $M_n$=819 g/mol and the polydispersity index PDI=1.52. For the low molecular weight component (<1025 g/mol), $M_n$=549 g/mol and the polydispersity index PDI=1.11; for the higher molecular weight component (>1025 g/mol), $M_n$=1727 g/mol and the polydispersity index PDI=1.12.

$^1$H NMR spectroscopy (400 MHz, $CDCl_3$): δ=0.47-0.62 (m, 0.045 H), 0.92 (bs, 0.14 H), 1.49-1.65 (m, 0.47 H, $OC(O)CH_2CH_2CH_2C(O)O$), 1.96-2.18 (m, 1 H, $OC(O)CH_2CH_2CH_2C(O)O$), 3.06-3.87 (m, 6.58 H, PET-1-$CH_2$), 4.41-4.59 (m, 0.28 H, $OCH_2O$), 4.79 (s, 0.26 H, $OCH_2O$), 4.95-5.08 (m, 0.32 H, $OCH_2O$), 5.39 (s, 0.03 H) ppm.

$^{13}$C APT NMR spectroscopy (400 MHz, $CDCl_3$): δ=18.8 (+, $OC(O)CH_2CH_2$), 18.9 (+, $OC(O)CH_2CH_2$), 19.0 (+, $OC(O)CH_2CH_2$), 19.0 (+, $OC(O)CH_2CH_2$), 19.2 (+, $OC(O)CH_2CH_2$), 21.8 (+), 28.4 (+), 28.7 (+), 17.3 (−), 31.0 (+), 32.0 (+, $OC(O)CH_2CH_2$), 32.0 (+, $OC(O)CH_2CH_2$), 32.1 (+, $OC(O)CH_2CH_2$), 32.2 (+, $OC(O)CH_2CH_2$), 32.3 (+, $OC(O)CH_2CH_2$), 60.3 (+, PET-1-$CH_2$), 62.6 (+, PET-1-$CH_2$), 66.6 (+, PET-1-$CH_2$), 66.8 (+, PET-1-$CH_2$), 68.1 (+, PET-1-$CH_2$), 68.6 (+, PET-1-$CH_2$), 69.2 (+, PET-1-$CH_2$), 69.5 (+, PET-1-$CH_2$), 71.6 (+, PET-1-$CH_2$), 84.3 (+, O—$CH_2$—O), 84.7 (+, O—$CH_2$—O), 85.7 (+, O—$CH_2$—O), 87.8 (+, O—$CH_2$—O), 88.3 (+, O—$CH_2$—O), 88.3 (+, O—$CH_2$—O), 89.0 (+, O—$CH_2$—O), 89.9 (+, O—$CH_2$—O), 91.4 (+, O—$CH_2$—O), 91.5 (+, O—$CH_2$—O), 92.6 (+, O—$CH_2$—O), 93.1 (+, O—$CH_2$—O), 171.5 (+, $C(O)OCH_2$), 171.6 (+, $C(O)OCH_2$), 172.0 (+, $C(O)OCH_2$), 174.8 (+, C(O)OH), 175.1 (+, C(O)OH) ppm.

The occurrence of a multitude of signals in the $^1$H NMR spectrum in the range of 4.4 to 5.1 ppm, and a multitude of signals having positive polarity in the $^{13}$C APT NMR spectrum in the range of 83.3 to 93.1 ppm, shows the presence of chemically nonequivalent oxymethylene groups in $(CH_2O)_n$ blocks having different chain lengths.

Comparison of the signal intensities of the $^1$H NMR signals for oxymethylene groups $CH_2O$ ($I_{CH2O}$=0.86 H) with the signal intensities of the $^1$H NMR signals for PET-1 $CH_2$ groups ($I_{PET-1}$=6.58 H) gives a molar ratio $CH_2O$:$(CH_2)_2O=I_{CH2O}:I_{PET-1}/2$=0.26. For an average chain length of 13.23 $(CH_2)_2O$— units per molecule, this gives an average of 3.44 oxymethylene units per molecule, or 1.72 oxymethylene units per chain end.

Comparison of the signal intensities of the $^1$H NMR signals for glutaric ester units $OC(O)(CH_2)_3C(O)O$ ($I_{GSE}$=1.47 H) with the $^1$H NMR signals for PET-1 $CH_2$ groups ($I_{PET-1}$=6.58 H) gives a molar ratio $OC(O)(CH_2)_3C(O)O$:$(CH_2)_2O=I_{GSE}/3:I_{PET-1}/2$=0.15. For an average chain length of 13.23 $(CH_2)_2O$— units per molecule, this gives an average of 1.98 glutaric ester units per molecule. The reaction of the polyoxymethylene block copolymer intermediate with glutaric anhydride accordingly proceeded with a conversion of 99%.

The HMBC NMR spectrum showed long-range coupling of a PET-1 $^{13}$C signal at 69.5 ppm to $^1$H signals in the range of 4.95-5.08 ppm, which, according to HSQC NMR spectroscopy, exhibited direct coupling to $^{13}$C signals at about 85 and 89 ppm. Both signals in the $^{13}$C APT NMR have positive polarity and can be attributed to oxymethylene groups. In addition, the HMBC NMR spectrum showed long-range coupling of a PET-1 $^{13}$C signal at about 68 ppm to $^1$H signals in the range of 4.41-4.59 ppm, which, according to HSQC NMR spectroscopy, exhibited direct couplings to $^{13}$C signals in the range of 84-93 ppm. All these $^{13}$C signals in the $^{13}$C APT NMR have positive polarity and can be attributed to oxymethylene groups. The $^{13}$C signals of the oxymethylene groups at about 89 ppm showed long-range coupling to a $^1$H NMR signal at about 3.4 ppm, which can be attributed to the terminal methylene groups of the PET-1. This showed that the polyethylene oxide block of the PET-1 is bonded covalently to the polyoxymethylene block.

The HMBC NMR spectrum showed long-range coupling of a CO $^{13}$C signal at 172 ppm, which can be attributed to the glutaric ester unit, to $^1$H signals in the range of 4.95-5.08 ppm, which, according to HSQC NMR spectroscopy, exhibited direct coupling to $^{13}$C signals at about 85 and 89 ppm. Both signals in the $^{13}$C APT NMR have positive polarity and can be attributed to oxymethylene groups. This showed that the glutaric ester unit is bonded covalently to the polyoxymethylene block.

These long-range couplings of PET-1 end groups on the one hand and glutaric ester units on the other hand to chemically nonequivalent oxymethylene units demonstrate clearly that polyoxymethylene blocks $(CH_2O)_n$ having different chain length n are present, which are bonded covalently both to PET-1 and to glutaric ester units which originate from the reaction with glutaric anhydride. The structure of the polyoxymethylene block copolymers according to the invention has thus been demonstrated beyond doubt.

ESI-MS (FTMS+p):

In the ESI mass spectrum, the following signal series were identified, which can be attributed to the following general empirical formulae:

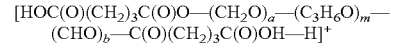

Series 1 (a+b=8): m/z (%) [m]=839 (1) [8], 883 (5) [9], 927 (14) [10], 971 (28) [11], 1015 (42) [12], 1059 (48) [13], 1103 (46) [14], 1147 (37) [15], 1191 (27) [16], 1235 (19) [17], 1279 (16) [18], 1323 (15) [19], 1367 (17) [20].

Series 2 (a+b=7): m/z (%) [m]=809 (1) [8], 853 (5) [9], 897 (16) [10], 941 (35) [11], 985 (60) [12], 1029 (75) [13], 1073 (76) [14], 1117 (64) [15], 1161 (47) [16], 1205 (32) [17], 1249 (22) [18], 1293 (18) [19], 1337 (18) [20].

Series 3 (a+b=6): m/z (%) [m]=823 (5) [9], 867 (14) [10], 911 (38) [11], 955 (69) [12], 999 (93) [13], 1043 (100) [14], 1087 (87) [15], 1131 (64) [16], 1175 (42) [17], 1219 (27) [18], 1263 (18) [19], 1307 (13) [20].

Series 4 (a+b=5): m/z (%) [m]=793 (1) [9], 837 (5) [10], 881 (12) [11], 925 (26) [12], 969 (40) [13], 1013 (48) [14], 1057 (44) [15], 1101 (33) [16], 1145 (22) [17], 1189 (18) [18], 1233 (7) [19], 1277 (2) [20].

Series 5 (a+b=4): m/z (%) [m]=939 (1) [13], 983 (5) [14], 1027 (10) [15], 1071 (17) [16], 1115 (23) [17], 1159 (26) [18], 1203 (7) [25], 1247 (21) [20].

Series 6 (a+b=3): m/z (%) [m]=909 (2) [13], 953 (5) [14], 997 (14) [15], 1041 (26) [16], 1085 (38) [17], 1129 (45) [18], 1173 (21) [25], 1217 (37) [20].

Series 7 (a+b=2): m/z (%) [m]=879 (1) [13], 923 (6) [14], 967 (15) [15], 1011 (33) [16], 1055 (51) [17], 1099 (61) [18], 1143 (62) [25], 1187 (52) [20].

Series 8 (a+b=1): m/z (%) [m]=849 (1) [13], 893 (3) [14], 937 (8) [15], 981 (19) [16], 1025 (33) [17], 1069 (44) [18], 1113 (46) [25], 1157 (40) [20].

In addition, the ESI mass spectrum shows signals for block copolymers of the invention which contain polyethylene oxide units, polyoxymethylene units and three glutaric ester units, and which can be assigned to the following general empirical formula:

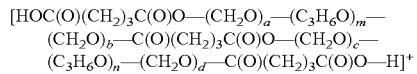

Series 9 (a+b+c+d=3): m/z (%) [m+n]=909 (1) [10], 953 (5) [11], 997 (14) [12], 1041 (27) [13], 1085 (38) [14], 1129 (45) [15], 1173 (44) [16], 1217 (37) [17], 1261 (29) [18], 1305 (21) [19], 1349 (19) [20], 1393 (20) [21], 1437 (26) [22], 1481 (32) [23], 1525 (39) [24], 1569 (45) [25], 1613 (49) [26], 1657 (49) [27], 1701 (45) [28], 1745 (39) [29], 1789 (32) [30], 1833 (25) [31], 1877 (17) [32], 1921 (12) [33], 1965 (8) [34], 2009 (5) [35], 2053 (5) [36], 2097 (2) [37].

Series 10 (a+b+c+d=2): m/z (%) [m+n]=879 (1) [10], 923 (6) [11], 967 (15) [12], 1011 (33) [13], 1055 (51) [14], 1099 (61) [15], 1143 (62) [16], 1187 (52) [17], 1231 (41) [18], 1275 (28) [19], 1319 (22) [20], 1363 (20) [21], 1407 (22) [22], 1451 (26) [23], 1495 (31) [24], 1539 (35) [25], 1583 (38) [26], 1627 (38) [27], 1671 (35) [28], 1715 (30) [29], 1759 (25) [30], 1803 (18) [31], 1847 (13) [32], 1891 (9) [33], 1935 (6) [34], 1979 (4) [35], 2023 (2) [36], 2067 (1) [37].

Series 11 (a+b+c+d=1): m/z (%) [m+n]=849 (1) [10], 893 (3) [11], 937 (9) [12], 981 (19) [13], 1025 (38) [14], 1069 (44) [15], 1113 (46) [16], 1157 (40) [17], 1201 (17) [18], 1245 (22) [19], 1289 (16) [20], 1333 (12) [21], 1377 (10) [22], 1421 (16) [23], 1465 (12) [24], 1509 (14) [25], 1553 (15) [26], 1597 (14) [27], 1641 (14) [28], 1685 (12) [29], 1729 (10) [30], 1773 (8) [31], 1817 (6) [32], 1861 (4) [33], 1905 (3) [34], 1979 (4) [35].

The ESI mass spectrum shows that polymers having molecular weights of <4500 g/mol which contain, as well as polyethylene oxide units $(C_3H_6O)_m$, at least one polyoxymethylene block $(CH_2O)_a$ with $a \geq 1$ and at least two glutaric ester units and hence correspond to the functionalized, low molecular weight polyoxymethylene block copolymers of the invention have been obtained.

IR spectroscopy: ν=2870 (vb), 1732 (b, ν[C=O]), 1452 (w), 1411 (vw), 1349 (w), 1295 (vw), 1246 (w), 1093 (m), 994 (vw), 928 (m), 846 (w), 523 (w) cm$^{-1}$.

The IR spectrum is neither identical to the IR spectrum of paraformaldehyde nor to the IR spectrum of PET-1. The C=O stretch vibration at 1732 cm$^{-1}$ can be attributed to the glutaric ester units and is not identical to the C=O stretch vibration of glutaric anhydride. The occurrence of this band demonstrates that the reaction of the terminal OH groups with glutaric anhydride was successful.

Inventive example 1 accordingly shows the preparation of a polyoxymethylene block copolymer and subsequent conversion of the OH-functional end groups of the resultant polymer to carboxylate groups.

Example 2

Preparation of a Carboxylic Acid-Terminated Polyethylene Oxide-Polymethylene Block Copolymer Reactor 1 was initially charged with a suspension of 29.83 g (0.331 mol) of 1,3,5-trioxane and 0.52 g (1.6 mmol) of 4-dodecylbenzenesulfonic acid in 30 ml of undecane. Reactor 2 contained a mixture of 460 mg (0.73 mmol) of dibutyltin dilaurate (DBTL), 22.6 g (69.5 mmol) of cesium carbonate and 20.5 g (34.2 mmol) of PET-1. Via a bypass line connected to MFC 1, the whole system with the bridge open was pressurized to 20 bar with $CO_2$. Then the bridge was closed and the pressure in reactor 1 was reduced to 5 bar by means of a gas outlet valve. The reaction mixture in reactor 1 was heated to 65° C. with the bridge shut off and kept at this temperature for 1.5 hours. The reaction mixture in reactor 2 was heated at 60° C. while stirring. The bridge temperature was adjusted to 170° C. Once the reaction mixture in reactor 1 had been heated to 65° C. for 1.5 hours, the pressure was adjusted to 20 bar with $CO_2$ via the bypass. The pressure in reactor 2 was adjusted to a value between 17 and 19 bar. The bypass line was closed and a constant $CO_2$ flow rate $\dot{V}_{in}$=160 ml/min was established using the mass flow regulators. The total pressure in the system was kept constant at 20 bar for the rest of the experiment with the aid of MFC 2. Then the temperature in reactor 1 was increased to 110° C. with the bridge open under a constant $CO_2$ flow. After 6 h, the bridge was closed and reactor 2 was cooled to 40° C. Subsequently, while stirring at an internal temperature of 40° C., an HPLC pump was used to introduce a solution of 7.53 g (65.9 mmol) of glutaric anhydride in 20 mL of 1,4-dioxane into reactor 2 at a flow rate of 5 mL/min. After the addition had ended, the reaction mixture in reactor 2 was stirred at 100° C. for a further 16 h. Subsequently, the system was cooled to room temperature and pressure in reactor 1 and 2 was released separately. A viscous, colorless oil was removed from reactor 2.

Viscosity: The product showed shear-thickening behavior in the shear rate range from 10 to 162 s$^{-1}$, and shear-thinning behavior in the shear rate range from 162 to 1000 s$^{-1}$.
Viscosity at shear rate 10 s$^{-1}$: 3056 mPa·s
Viscosity at shear rate 162 s$^{-1}$: 3173 mPa·s
Viscosity at shear rate 1000 s$^{-1}$: 2986 mPa·s $^1$H NMR spectroscopy (400 MHz, CDCl$_3$): δ=0.75-0.88 (m, 0.359 H), 1.12-1.27 (m, 1.082 H), 1.78-1.96 (m, 2.988 H, —C(O)CH$_2$CH$_2$CH$_2$C(O)OH), 2.20-2.43 (m, 6.099 H, —C(O)CH$_2$CH$_2$CH$_2$C(O)OH), 3.36-3.44 (m, 0.311 H, PET-1-CH$_2$), 3.44-3.69 (m, 45.87 H, PET-1-CH$_2$), 3.69-3.80 (m, 2.148 H, PET-1-CH$_2$), 4.10-4.20 (m, 0.656 H), 4.70-4.80 (m, 1.595 H, OCH$_2$O), 4.80-4.90 (m, 1.602 H, OCH$_2$O), 5.09 (s, 0.433 H, OCH$_2$O), 5.19-5.26 (m, 1.112 H, OCH$_2$O), 5.26-5.31 (m, 0.999 H, OCH$_2$O), 9.17 (bs, 1.859 H) ppm.

The occurrence of a multitude of signals in the $^1$H NMR spectrum in the range of 4.7 to 5.3 ppm shows the presence of chemically nonequivalent oxymethylene groups in (CH$_2$O)$_a$ blocks having different chain lengths.

Comparison of the signal intensities of the $^1$H NMR signals for oxymethylene groups CH$_2$O (I$_{CH2O}$=5.74 H) with the signal intensities of the $^1$H NMR signals for PET-1 CH$_2$ groups (I$_{PET-1}$=48.33 H) gives a molar ratio CH$_2$O:(CH$_2$)$_2$O=I$_{CH2O}$:I$_{PET-1}$/2=0.24. For an average chain length of 13.23 (CH$_2$)$_2$O— units per molecule, this gives an average of 3.16 oxymethylene units per molecule.

Comparison of the signal intensities of the $^1$H NMR signals for glutaric ester units OC(O)(CH$_2$)$_3$C(O)O ($I_{GSE}$=9.09 H) with the $^1$H NMR signals for PET-1 CH$_2$ groups ($I_{PET-1}$=48.33 H) gives a molar ratio OC(O)(CH$_2$)$_3$C(O)O:(CH$_2$)$_2$O=$I_{GSE}$/3:$I_{PET-1}$/2=0.13. For an average chain length of 13.23 (CH$_2$)$_2$O— units per molecule, this gives an average of 1.72 glutaric ester units per molecule. The reaction of the polyoxymethylene block copolymer intermediate with glutaric anhydride accordingly proceeded with a conversion of 86%.

IR spectroscopy: ν=2867 (m), 1732 (m, ν[C=O]), 1558 (vw), 1452 (w), 1412 (w), 1350 (w), 1291 (w), 1247 (w), 1097 (vs), 1040 (m), 995 (m), 946 (m), 871 (m), 848 (m), 614 (vw), 523 (w) cm$^{-1}$.

The IR spectrum is neither identical to the IR spectrum of paraformaldehyde nor to the IR spectrum of PET-1. The C=O stretch vibration at 1732 cm$^{-1}$ can be attributed to the glutaric ester units and is not identical to the C=O stretch vibration of glutaric anhydride. The occurrence of this band demonstrates that the reaction of the terminal OH groups with glutaric anhydride was successful.

Inventive example 2 accordingly shows the preparation of a polyoxymethylene block copolymer and subsequent conversion of the OH-functional end groups of the resultant polymer to carboxylate groups.

Example 3

Reaction of the Carboxylic Acid-Terminated Polyethylene Oxide-Polyoxymethylene Block Copolymer Obtained in Example 2 with Isocyanate 1

A beaker was initially charged with 5.02 g of the carboxylic acid-terminated polyethylene oxide-polyoxymethylene block copolymer obtained in example 2, 0.25 mL of water and 10.3 mg (0.016 mmol) of dibutyltin dilaurate (DBTL), and the mixture was heated to 60° C. Subsequently, 0.62 g of isocyanate 1 was added while stirring and the mixture was stirred vigorously. After 3 s, significant foam formation was observed, which had abated after 20 s. A yellow gel was obtained.

Unlike the starting materials, the resultant product was insoluble in dichloromethane and THF. This showed that reaction with isocyanate 1 gave an insoluble polymer of higher molecular weight.
Viscosity: The product showed shear-thinning behavior.
Viscosity at shear rate 0.01 s$^{-1}$: 10 500 mPa·s
Viscosity at shear rate 927 s$^{-1}$: 8684 mPa·s The viscosity was distinctly increased over the entire shear rate measurement range compared to the carboxylic acid-terminated polyethylene oxide-polyoxymethylene block copolymer obtained in example 2 and used here (viscosity between 2986 and 3173 mPa·s). This showed that a reaction with isocyanate 1 to give a polymer of higher molecular weight was successful.

Example 3 thus demonstrates the reaction of a carboxylic acid-terminated polyoxymethylene block copolymer with a diisocyanate to give a polymer of higher molecular weight.

Example 4

Reaction of the Carboxylic Acid-Terminated Polyethylene Oxide-Polyoxymethylene Block Copolymer Obtained in Example 2 with Phenyl Glycidyl Ether 5.04 g of the carboxylic acid-terminated polyethylene oxide-polyoxymethylene block copolymer obtained in example 2 were weighed into a glass flask together with 26.7 mg (0.102 mmol) of triphenylphosphine and 1.41 g (9.39 mmol) of phenyl glycidyl ether (PGE), and the mixture was stirred at 80° C. under reflux for 18 h, in the course of which the mixture changed color from yellow to dark red. The product was used further as obtained.
Viscosity: The product showed shear-thinning behavior.
Viscosity at shear rate 0.01 s$^{-1}$: 3890 mPa·s
Viscosity at shear rate 589 s$^{-1}$: 3658 mPa·s
Viscosity at shear rate 1000 s$^{-1}$: 3574 mPa·s
$T_g$=−42.59° C.

$^1$H NMR spectroscopy (400 MHz, CDCl$_3$): δ=0.79-0.88 (m, 0.135 H), 1.15-1.30 (m, 0.465 H), 1.81-2.01 (m, 1.971 H, —C(O)CH$_2$CH$_2$CH$_2$C(O)—), 2.17-2.49 (m, 3.892 H, —C(O)CH$_2$CH$_2$CH$_2$C(O)—), 3.38-3.45 (m, 0.181 H), 3.45-3.72 (m, 29.28 H, PET-1-CH$_2$), 3.72-3.88 (m, 1.301 H, PET-CH$_2$), 3.91-4.02 (m, 1.622 H), 4.02-4.36 (m, 5.773 H, PGE-CH/PGE/CH$_2$), 4.36-4.50 (0.257 H), 4.74-4.82 (m, 0.256H, OCH$_2$O), 4.82-4.89 (m, 0.243 H, OCH$_2$O), 5.12 (s, 0.187 H, OCH$_2$O), 5.15-5.39 (m, 0.956 H), OCH$_2$O), 6.80-6.97 (m, 3.000 H, PGE-CH$_{ar}$), 7.17-7.39 (m, 2.160 H, PGE-CH$_{ar}$/CHCl$_3$), 7.39-7.48 (m, 0.105 H, PPh$_3$), 7.48-7.55 (m, 0.0458 H, PPh$_3$), 7.57-7.67 (m, 0.0896 H, PPh$_3$) ppm.

The $^1$H NMR spectrum showed new signals in the range of 4.02-4.38 ppm and in the aromatic range (6.80-7.39 ppm), which indicate the incorporation of phenyl glycidol ether in the form of 2-hydroxy-3-phenoxypropyloxy groups PhO—CH$_2$—CH(OH)—CH$_2$—O— (assigned as PGE-CH$_2$ or PGE-CH and PGE-CH$_{ar}$). The ratio of the integrals for PGE-CH$_{ar}$ (6.80-6.97 ppm, 3 H) and —C(O)CH$_2$CH$_2$CH$_2$C(O)— (1.81-2.01 ppm, 1.971 H) showed that the reaction of the terminal carboxylic acid groups with phenyl glycidyl ether proceeded quantitatively.

Example 5

Reaction of the Hydroxy-Functionalized Polyethylene Oxide-Polyoxymethylene Block Copolymer Obtained in Example 4 with Isocyanate 1

A beaker was initially charged with 4.13 g of the hydroxy-functionalized polyethylene oxide-polyoxymethylene block copolymer obtained in example 4, 0.25 mL of water and 8.0 mg (0.013 mmol) of DBTL, and the mixture was heated to 60° C. Subsequently, 0.62 g of isocyanate 1 was added while stirring and the mixture was stirred vigorously. After 4 s, significant foam formation was observed, which had abated after 20 s. A brown gel was obtained.

Unlike the starting materials, the resultant product was insoluble in dichloromethane and THF. This showed that reaction with isocyanate 1 gave an insoluble polymer of higher molecular weight.
Viscosity: The product showed shear-thinning behavior.
Viscosity at shear rate 3.35 s$^{-1}$: 1 447 000 mPa·s
Viscosity at shear rate 1000 s$^{-1}$: 31 950 mPa·s The viscosity was distinctly increased over the entire shear rate measurement range compared to the hydroxy-functionalized polyethylene oxide-polyoxymethylene block copolymer obtained in example 4 and used here (viscosity between 3574 and 3890 mPa·s). This showed that a reaction with isocyanate 1 to give a polymer of higher molecular weight was successful.
$T_g$=−29.41° C.

Compared to the hydroxy-functionalized polyethylene oxide-polyoxymethylene block copolymer obtained in example 4 and used here ($T_g$=−42.59° C.), the glass transition temperature after reaction with isocyanate 1 was distinctly increased. This showed that the reaction of the hydroxy-functionalized polyethylene oxide-polyoxymethylene block copolymer with isocyanates was successful.

After the reaction of the hydroxy-functionalized polyethylene oxide-polyoxymethylene block copolymer obtained in example 4 with isocyanate 1, the viscosity and glass transition temperature were distinctly increased. This showed that a reaction with isocyanate 1 to give a polyurethane polymer of higher molecular weight had taken place.

Examples 4 and 5 thus demonstrate the reaction of a carboxylic acid-terminated polyethylene oxide-polyoxymethylene block copolymer with epoxides to give a hydroxy-functionalized polyethylene oxide-polyoxymethylene block copolymer and the subsequent reaction thereof with a diisocyanate to give a polyurethane polymer.

The invention claimed is:

1. A process for preparing functionalized polyoxymethylene block copolymers, comprising the step of
polymerizing formaldehyde in a reaction vessel in the presence of a catalyst, wherein the polymerization of formaldehyde is effected in the presence of a starter compound having at least 2 Zerewitinoff-active hydrogen atoms, and wherein the polymerizing step produces an intermediate having a number-average molecular weight of <4500 g/mol, and
the intermediate is reacted with a cyclic carboxylic or carbonic ester, giving a functionalized polyoxymethylene block copolymer.

2. The process as claimed in claim 1, wherein the catalyst is selected from the group consisting of basic catalysts, Lewis-acidic catalysts, and combinations thereof.

3. The process as claimed in claim 1, wherein the reaction of the intermediate with the cyclic carboxylic or carbonic ester is conducted in the presence of a catalyst which is the same catalyst as in the preceding polymerization of formaldehyde.

4. The process as claimed in claim 1, wherein the starter compound has a number-average molecular weight of ≥62 g/mol to ≤4470 g/mol.

5. The process as claimed in claim 4, wherein the starter compound has a number-average molecular weight of ≥100 g/mol to ≤3000 g/mol.

6. The process as claimed in claim 1, wherein the starter compound is selected from the group consisting of polyether polyols, polyester polyols, polyether ester polyols, polycarbonate polyols, polyacrylate polyols, and combinations thereof.

7. The process as claimed in claim 1, wherein the cyclic carboxylic or carbonic ester is selected from the group consisting of aliphatic lactones, aromatic lactones, lactides, cyclic carbonates, cyclic anhydrides, and combinations thereof.

8. The process as claimed in claim 1, wherein the formaldehyde is introduced into the reaction vessel as gaseous formaldehyde.

9. The process as claimed in claim 1, wherein the polymerization is effected in the presence of a comonomer.

10. A functionalized polyoxymethylene block copolymer prepared by a process as claimed in claim 1.

11. A functionalized polyoxymethylene block copolymer as claimed in claim 10 having a number-average molecular weight of ≤12 000 g/mol.

12. A functionalized polyoxymethylene block copolymer as claimed in claim 10 having a viscosity at 20° C. of ≤100 000 mPa s.

13. A composition comprising the functionalized polyoxymethylene block copolymer as claimed in claim 10, wherein the composition is selected from the group consisting of polyamides, polyurethanes, washing and cleaning composition formulations, drilling fluids, fuel additives, ionic and nonionic surfactants, lubricants, process chemicals for papermaking or textile production, and cosmetic formulations.

* * * * *